Jan. 5, 1954
E. GEOFFRION
2,664,948
TIME CONTROLLED CIRCUIT SELECTOR
Filed Aug. 10, 1951
6 Sheets-Sheet 3
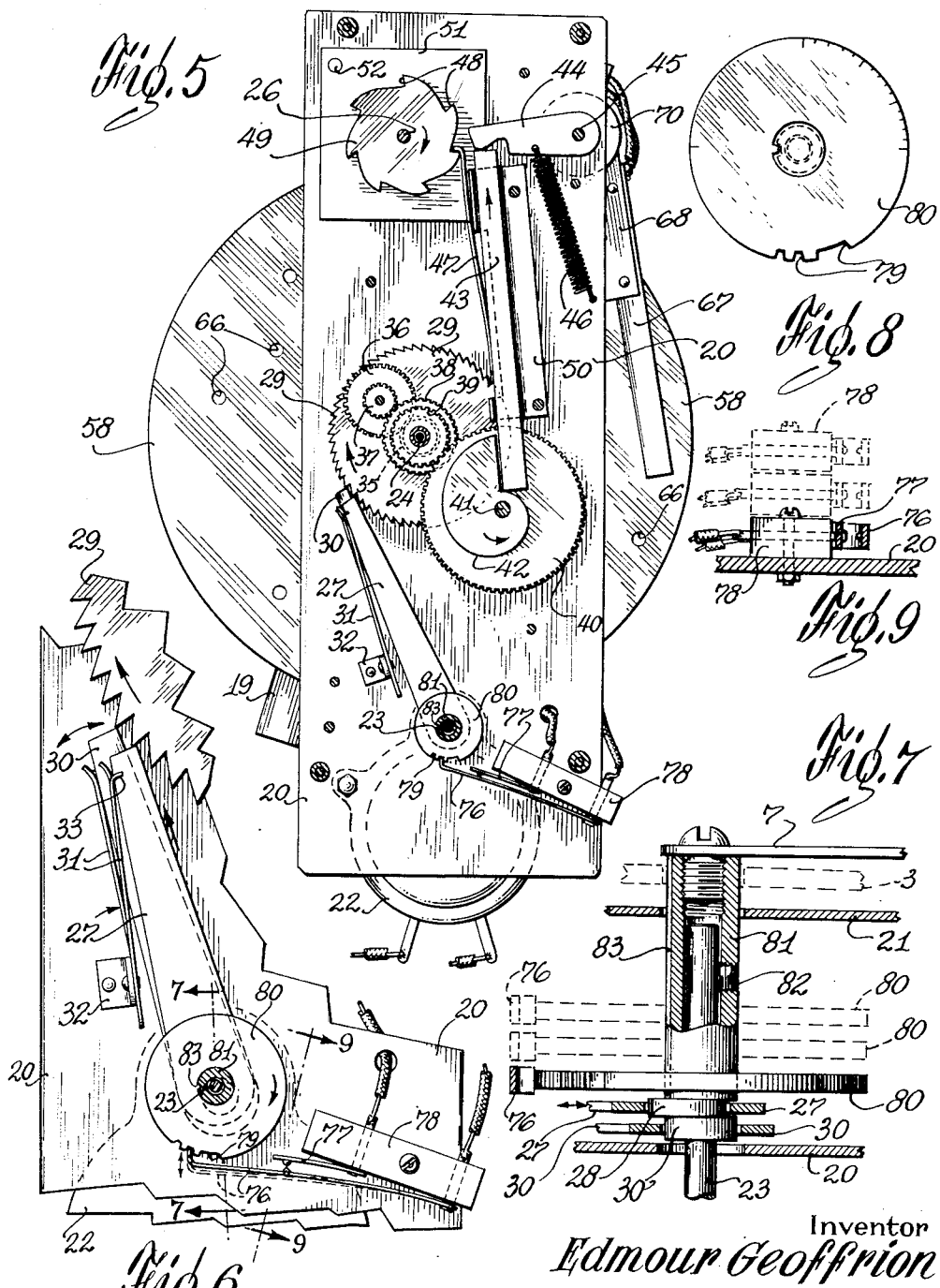
Inventor
Edmour Geoffrion
Attorneys Jan. 5, 1954 E. GEOFFRION 2,664,948
TIME CONTROLLED CIRCUIT SELECTOR
Filed Aug. 10, 1951 6 Sheets-Sheet 4

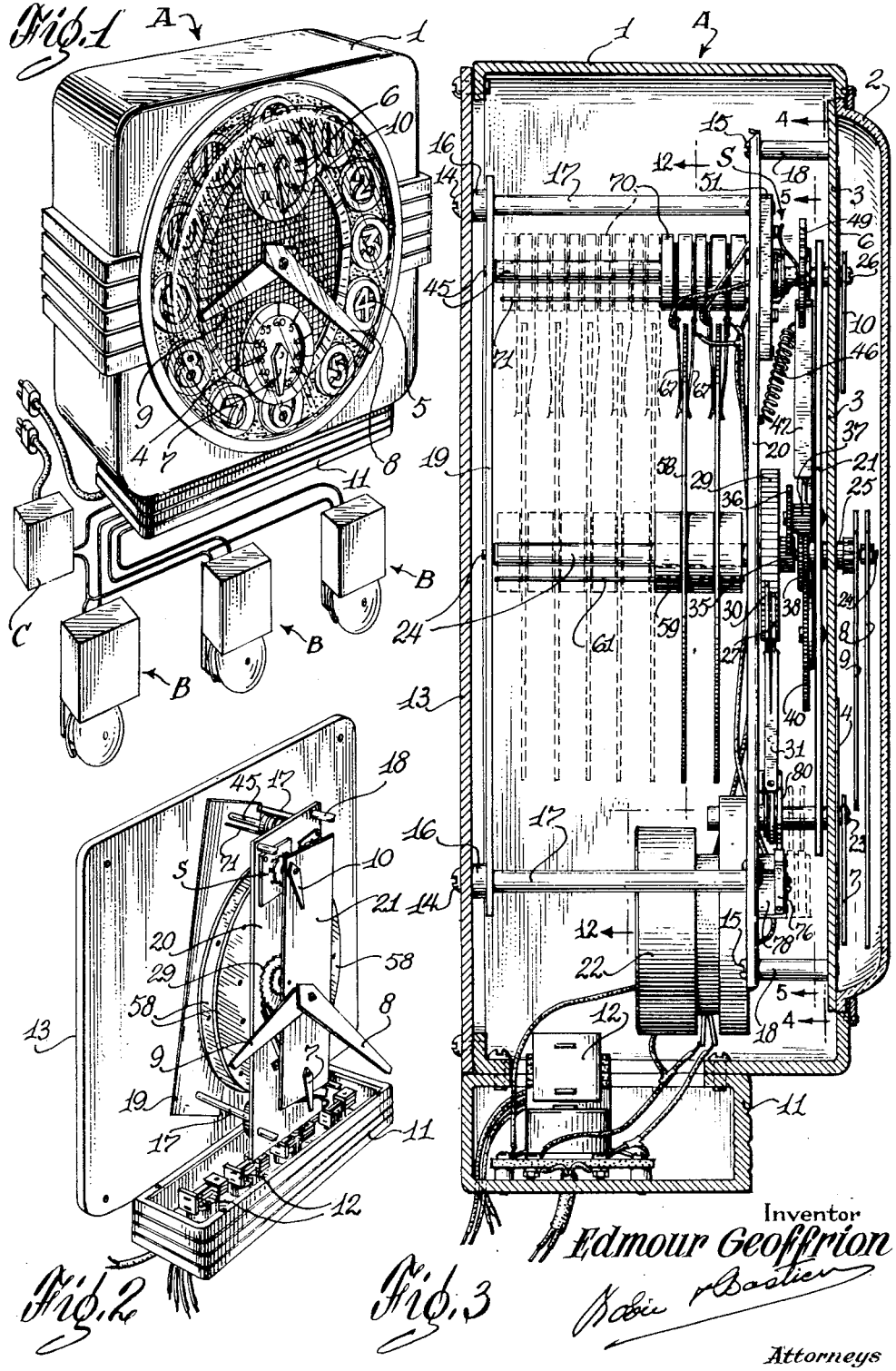

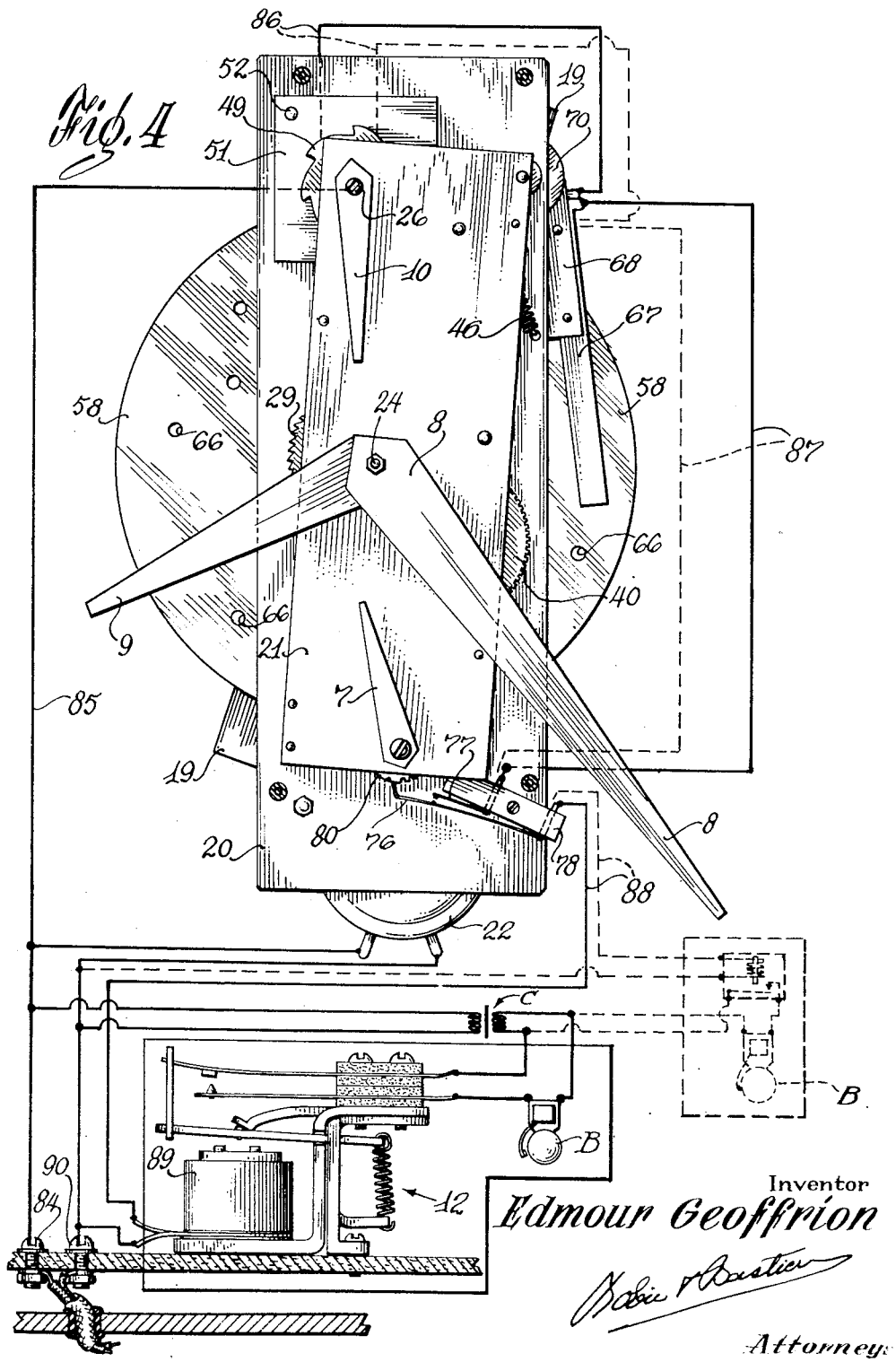

Inventor
Edmour Geoffrion

Attorneys

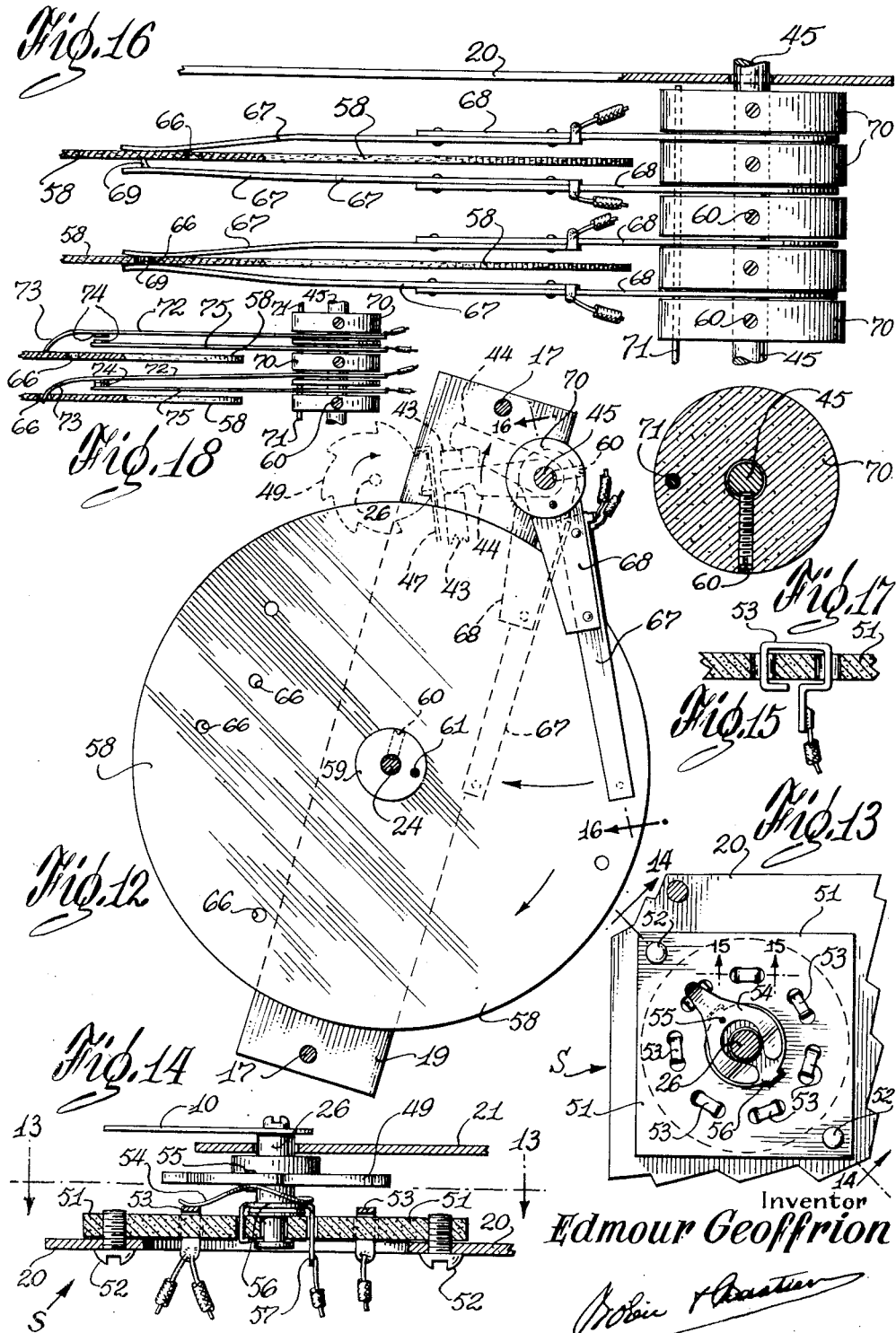

Jan. 5, 1954

E. GEOFFRION 2,664,948

TIME CONTROLLED CIRCUIT SELECTOR

Filed Aug. 10, 1951

Inventor
Edmour Geoffrion

Attorneys

Patented Jan. 5, 1954

2,664,948

UNITED STATES PATENT OFFICE 2,664,948

TIME CONTROLLED CIRCUIT SELECTOR

Edmour Geoffrion, Ville St. Laurent, Quebec, Canada, assignor, by mesne assignments, to Romeo Geoffrion, Montreal, Quebec, Canada Application August 10, 1951, Serial No. 241,198

13 Claims. (Cl. 161—1)

The present invention relates to a time controlled circuit selector and more particularly to a circuit selector which is capable of closing a plurality of independent electric circuits according a predetermined time program.

The main object of the present invention is the provision of a circuit selector of the character described in the form of a clock capable of closing a number of independent electric circuits according to a number of different programs for each day of the week.

Another important object of the present invention is the provision of a time-controlled circuit selector in which the closure of the circuits is effected with substantially one second precision.

Another important object of the present invention is the provision of a time-controlled circuit selector for closing different independent circuits according to predetermined programs different every day of the week, said programs capable of being changed manually, easily and quickly by non-skilled persons.

Still another important object of the present invention is the provision of a time-controlled circuit selector of the character described which may be provided with a great variety of programs.

Yet another important object of the present invention is the provision of a circuit selector in which the signals may be given every minute of the day.

Yet another important object of the present invention is the provision of a time-controlled circuit selector in the form of a clock which is compact and inexpensive to manufacture.

Still another important object of the present invention is the provision of a time-controlled circuit selector in the form of a seven-day clock in which the component parts are non-precision built.

The foregoing and other important objects of the present invention will become more apparent during the following disclosure and by referring to the drawings in which:

Fig. 1 is a perspective view of the device according to the invention embodied as a multiple alarm clock;

Fig. 2 is a perspective view of the internal elements of the clock, the housing being removed;

Fig. 3 is a cross-sectional elevation of the clock according to Fig. 1;

Fig. 4 is a section along line 4—4 of Fig. 3 showing the hands of the clock in place;

Fig. 5 is a section along line 5—5 of Fig. 3;

Fig. 6 is a detailed fractional view of part of the mechanism shown in Fig. 5;

Fig. 7 is a cross-section along line 7—7 of Fig. 6;

Fig. 8 is an elevation of one of the discs controlling the duration and number of closures of the electric circuits controlled by the device according to the invention;

Fig. 9 is a section along line 9—9 of Fig. 6;

Fig. 12 is a section along line 12—12 of Fig. 3;

Fig. 13 is a plan view of the rotary switch for changing the program every day and being a section along line 13—13 of Fig. 14;

Fig. 14 is a section along line 14—14 of Fig. 13;

Fig. 15 is a section along line 15—15 of Fig. 13;

Fig. 16 is an enlarged section along line 16—16 of Fig. 12;

Fig. 17 is a cross-section of one of the spacer elements shown in Fig. 16;

Fig. 18 is a view similar to that of Fig. 16 showing another embodiment of the contact fingers in association with the program discs according to the invention;

Figures 10, 11:
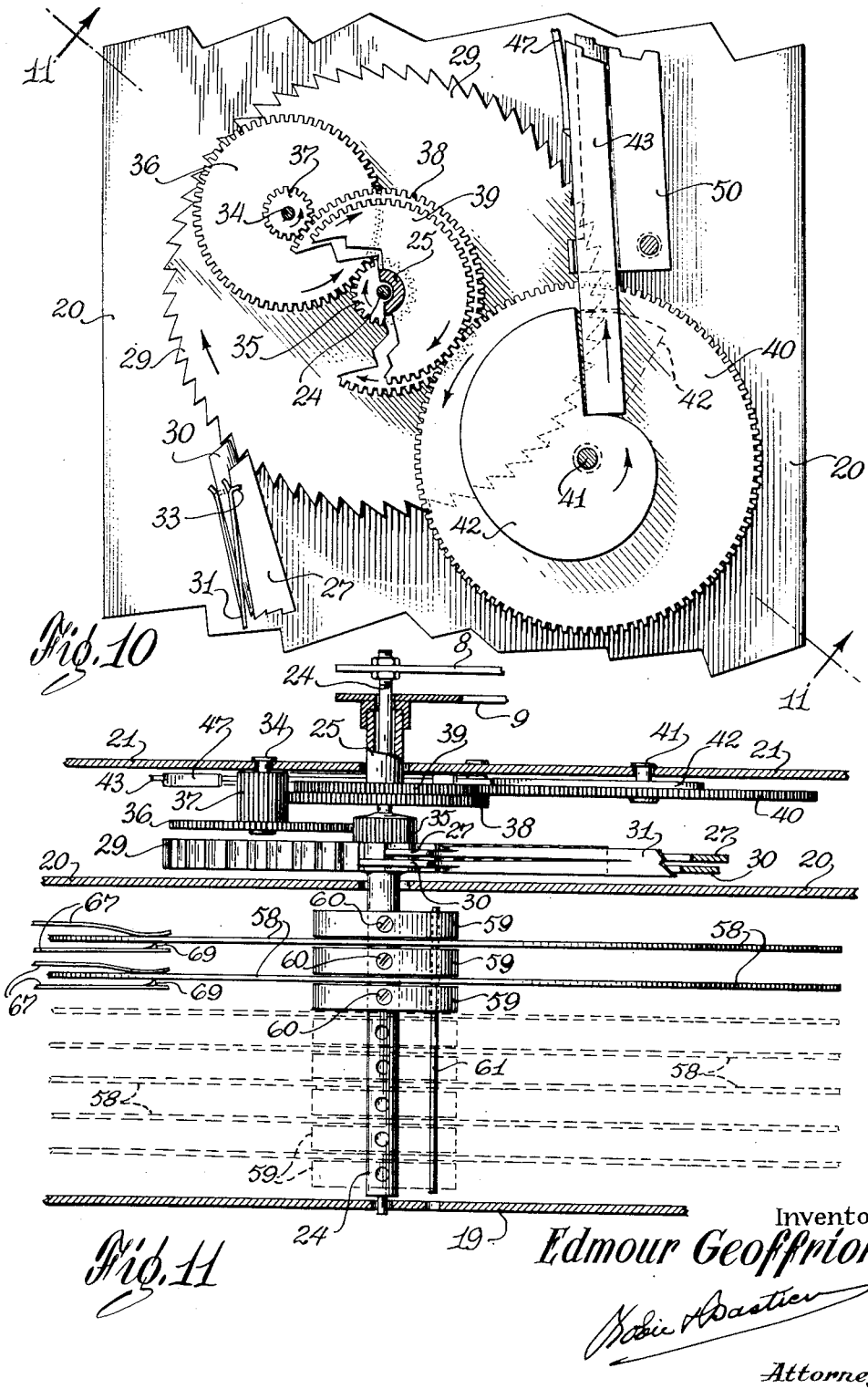
Fig. 10 is an enlarged fractional view of another part of the mechanism shown in Fig. 5.
Fig. 11 is a section along line 11—11 of Fig. 10.

Referring now more particularly to the drawings in which like reference characters indicate like elements throughout the selector according to the invention may take the form of an electric clock A for operating a plurality of electric circuits such as the alarms B, one or more at a time and at predetermined times of the day according to a definite program, it being possible to vary said program each day of the week.

The clock A is contained in a housing 1, the front opening of which is covered with the transparent plate 2 disposed over the dial plate 3, on which are marked the seconds dial 4, the hours and minutes dial 5, and the days dial 6. Correspondingly there is provided the seconds hand 7, the minutes hand 8, the hours hand 9 and the days hand 10. The electric clock is directly connected to a standard source of electric power such as a 110 volt line while the alarms B are fed through a suitable transformer C. The clock is further provided with a base 11 housing the desired number of relays 12 for controlling the alarms B.

To the back plate 13 of the housing are secured in spaced parallel relationship by means of bolts 14 and 15 and suitable spacers 16, 17 and 18, two mechanism supporting plates 19 and 20 and the dial plate 3 respectively. Another plate 21 extends between the plate 20 and the dial plate 3.

A suitable synchronous electric motor 22 provided with a suitable gear reducing mechanism is secured to the plate 20 at the base thereof and behind the same. The shaft 23 of said electric motor 22 is journaled between the plates 20 and 21 and carries the second hand 7. The shaft 23 rotates at one revolution per minute, and drives the remaining mechanism of the device according to the invention.

The minutes shaft 24 is journaled at one end to the plate 19 and projects from the dial plate 3; it rotates 1 revolution per hour. The tubular hours shaft 25 encloses the front end portion of the shaft 24 and rotates 1 revolution per twelve hours. The minutes hand 8 and hours hand 9 are respectively rigidly connected to the shafts 24 and 25.

The days shaft 26 is journaled in the plate 21 and the days hand 10 is rigidly secured to the front end thereof. The shaft 26 rotates 1 revolution per week.

The driving shaft 23 actuates the shafts 24, 25 and 26 in the following manner, reference being had to Figs. 5, 6 and 7 together with Figs. 10 and 11. An actuating pawl 27 surrounds at its lower end an eccentric 28 rigidly secured to the driving shaft 23. The bevelled upper end of the pawl 27 engages the teeth of a ratchet wheel 29 which is secured to the minutes shaft 24 intermediate the plates 20 and 21. A stop arm 30 is also pivotally mounted at its lower end on the bushing 30' secured to the shaft 23, and has its upper end engaging the teeth of the ratchet wheel 29 to prevent backward movement of the latter. The pawl 27 and arm 30 are urged towards the teeth of the ratchet wheel 29 by means of a slit leaf spring 31 secured to the plate 20 by means of a bracket 32 and having the free end of each slit section split to have a bent portion 33 contacting the outer side face of said pawl 27 and arm 30.

Thus the shaft 23 revolving one turn a minute will cause the arm 27 to displace the ratchet wheel 29 the amount of one tooth per minute, and, there being sixty such teeth around the periphery of said wheel 29, the shaft 24 to which it is secured will rotate one turn per hour.

It will be noted that the eccentric cam 28 may be of such a form that the ratchet wheel 29 may remain stationary for a substantial part of every minute up to 55 seconds.

The hour shaft 25 which rotates one turn per 12 hours is driven through the intermediary of the pinion 35 keyed to the minutes shaft 24 and meshing with the gear wheel 36 pivoted on a pin 34 mounted on the supporting plate 21 and to which is rigidly connected the pinion 37 meshing with the gear wheel 38, the latter being rigidly connected to said shaft 25. A second gear wheel 39 having a slightly smaller diameter than the gear wheel 38, is also rigidly connected to the shaft 25 and meshes with a gear wheel 40 of twice the diameter of the latter, which is rotatively mounted on the shaft 41 mounted on the plate 21, and which revolves one turn per day.

A spiral cam 42 is rigidly secured and driven by the gear wheel 40 to impart to a bar 43 a gradual axial movement away from the shaft 41, said movement being completed once a day, whereupon the bar 43 drops to its initial position. One end of said bar 43 rests on the outer face of said spiral cam 42 and the other end contacts an arm 44 as shown in Fig. 5 which is pivoted on a shaft 45 and is urged towards the bar 43 by means of a spring 46 attached at its other end to the mechanism supporting plate 20. A hooked leaf spring 47 attached to the bar 43 engages successively the seven teeth 48 of a ratchet wheel 49 keyed to the days shaft 26 which thus rotates one turn per week.

A bracket 50 secured to the plate 21 forms a suitable guiding member for the bar 43.

Associated with the days shaft 26 is a rotary switch, shown in Figs. 13 and 15, comprising an insulating plate 51 secured to the mechanism mounting plate 20 by means of screws 52 and mounting a plurality of circularly disposed stationary electric contacts 53 preferably seven in number. These contacts 53 are shown more particularly in Fig. 15 and consist in a metallic loop passing through apertures made in the insulating plate 51. A leaf spring contact 54 is secured by a rivet 55 to the ratchet wheel 49 to rotate therewith and have its free end adapted to contact in succession the seven stationary contacts 53 its other end being forked, surrounding the shaft 26 and contacting a stationary collar 56 having a connecting tap 57.

Thus the rotary switch just described may close in succession up to seven different circuits from its central tap 57.

As shown in Figs. 12 and 16 there is mounted on the minutes shaft 24 which turns one turn per hour a plurality of spaced parallel program discs 58 extending between the mechanism supporting plates 19 and 20.

The program discs 58 are maintained in spaced relationship by means of spacer elements 59 keyed to the shaft 24 by set screws 60 and provided with a registering hole for the insertion of a rod 61 which enters registering holes 62 made in the program discs 58 for maintaining the same in proper angular position relatively to one another.

Figure 19:
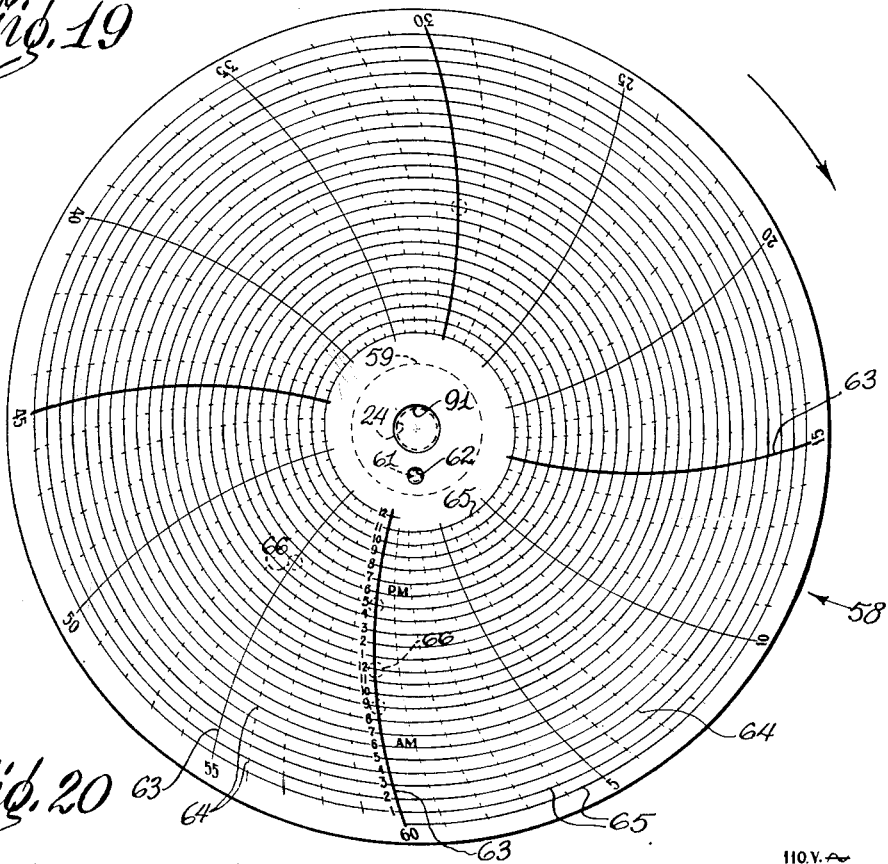
Fig. 19 is a plan view of one of the program discs according to the invention.

The program discs 58 are preferably made of fibre board or like material and, as shown in Fig. 19, are preferably printed with lines and numbers representing the different hours and minutes of the days. Curved radial solid lines 63 are equally spaced at five minute intervals around the program discs while the intermediate dotted radial lines 64 indicate a one minute interval. A continuous spiral line 65 co-axial with the center hole 91 of the disc for insertion of the shaft 24, crosses the radial lines 63, 64, and the hours of the day are marked at the intersections of said spiral with the 60 minutes radial line 63.

Thus, it is a simple matter to punch the program discs 58 with holes 66 suitably disposed according to the time program desired.

As shown in Figs. 12 and 16, a pair of resilient contact fingers 67 are provided for each of the program discs 58, said contact fingers being rigidly secured to the arms 68 which are keyed to the shaft 45. The contact fingers 67 are disposed on both sides of each program disc 58 and are made of resilient material so that the inwardly bent contact tip 69 of one of said contact fingers in each pair may be adapted to engage the punch holes 66 and contact the other finger 67 of said pair, thereby closing the electric circuit to which said fingers are connected.

As shown in Fig. 2, the contact fingers supporting arms 68 are maintained in spaced parallel relationship on the shaft 25 by means of suitable spacer discs 70 having a side hole for the insertion of a transverse rod 71 which maintains said contact fingers 67 in alignment.

According to another embodiment of the contact fingers, shown in Fig. 18, each pair thereof extends on only one side of each program disc 58, the outer contact finger 72 being inwardly curved at its free end 73 to engage the punch holes 66 of the program discs 58 when registering with the same thereby making the contact at 74 with the other inner finger 75 of each pair. In this manner any sparks appearing at the opening or closing of the contacts 74 will not burn or otherwise damage the program discs 58. Furthermore, the contacts 74 will last longer.

Each pair of contact fingers 67 or 72, 75 are adapted to swing across the faces of the program discs 58 under the action of the mechanism comprising the spiral cam 42, the pusher bar 43, the arm 44 and shaft 45. A complete turn of the spiral cam 42 will gradually move the contact fingers from a point adjacent the periphery of the program discs 58 towards the center thereof. Therefore, the contact tip 69 of the contact fingers 67 or the inwardly curved free end 73 of the contact fingers 72, 75 will follow the spiral line 65 printed on the program discs 58 as shown in Fig. 19 and will successively register with the different punch holes 66 disposed along said spiral line 65.

The contact fingers 67 or 72, 75 are connected in series with one or more pairs of leaf spring contacts 76, 77 shown in Figs. 5 and 6. Each pair of contacts 76, 77 is secured in opposed relationship to an insulating block 78 itself secured to the mechanism supporting plate 20 adjacent the seconds shaft 23. The outer leaf spring contact 76 has a curved outer end adapted to engage the notches 79 made at the periphery of a notch disc 80 itself keyed to the seconds shaft 23 and more particularly, as shown in Fig. 7, keyed to the sleeve 81 enclosing said shaft 23 and secured thereto by means of the set screw 82 and provided with a longitudinal key-way 83 for maintaining the plurality of notched discs 80 in the right angular relationship.

Because the notched discs 80, which are mounted on the seconds shaft 23, rotate one turn per minute, the notches 79 may be disposed at the periphery of said discs 80 with a second precision so as to obtain the closure of the contacts 76, 77 at the exact second or seconds required. It is also obvious that the length of said notches may be varied and any combination of notches 79 of equal or different lengths may be had for obtaining any combination of signals at the alarms B.

Fig. 4 shows somewhat schematically the electric circuit of the device according to the invention. From one feeding tap 84 the current is fed by means of a wire 85 to the center tap 57 of the rotary switch S which closes the circuit to any one of the stationary contacts 53; the latter are connected in series to one or more contact fingers 67, or 72, 75 by the leads 86 and said contact fingers are connected in series through the wires 87 to the leaf spring contacts 77, the leaf spring contact 76 being connected in series by means of a wire 88 to the coil 89 of the relay 12 and finally to the other feed tap 90.

The transformer C for actuating the secondary circuit of the relay 12 comprising the alarms B is connected in parallel to the feed taps 84 and 90. Therefore, upon closure of the rotary switch S of the contact fingers 67 or 72, 75 and of the leaf spring contacts 66, 67 the solenoid of the corresponding relay 12 will be energized to actuate the associated alarms B.

Figure 20:
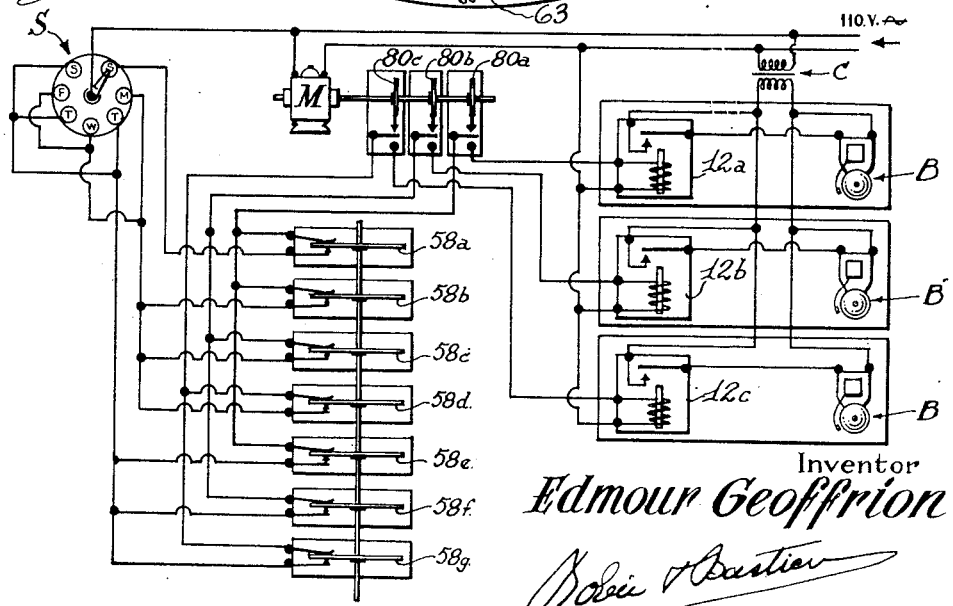
Fig. 20 is a schematic electric circuit of one of a plurality of manners of connecting the device according to the invention.

In Fig. 20, there is shown a schematic electric circuit for a typical ringing program.

In this electric circuit diagram, to the seven program discs 58a to 58g, there corresponds the three notched discs 80a, 80b, 80c with associated leaf spring contacts 76, 77 and relays 12a, 12b, 12c, each of the latter feeding an alarm B.

In the circuit diagram the rotary switch S is seen closing the Sunday circuit which comprises the program disc 58a, the notched disc 80a and corresponding relay 12a and alarm B.

If the rotary switch S was set on the Monday circuit it will be seen that three program discs will be connected namely: 58b, 58c and 58d. Therefore, during that day, three different types of alarms B could be actuated at different times of the day.

Looking at the rotary switch S it is seen that the Monday and Wednesday circuits are the same, while the Tuesday, Thursday and Saturday circuits are the same.

Of course, the foregoing is a typical circuit installation which may be varied at will; the number of program discs 58 and notched discs 80 and corresponding contact fingers may be changed according to the particular use to which the device, according to the invention, will be put.

While a preferred embodiment according to the invention has been illustrated and described it is understood that various modifications may be resorted to without departing from the spirit and scope of the appended claims.

What I claim is:

1. In a time-controlled circuit selector, a plurality of rotatable members having spirally arranged electric contact arms operating means, electric contact arms associated with each of said members, swingable thereacross to be operated by said means when sweeping across said members, means for rotating said members at an equal number of revolutions per unit time, and means for swinging said arms in timed relation with said members such that said members will effect several revolutions for one swinging movement of said arms, whereby said arms may be operated at predetermined time intervals during rotational movement of said members.

2. In a time-controlled circuit selector, a casing, a plurality of rotatable discs mounted in said casing and having a plurality of electric contact arms operating means arranged along a spiral line having a plurality of circumvolutions, electric contact arms associated with each of said discs, pivoted on said casing at a point spaced from the axis of said discs and swingable thereacross to be successively operated by said means when sweeping across said same discs, means for rotating said discs at an equal number of revolutions per unit time, and means for swinging said arms in timed relation with said discs from the periphery thereof to a point near their axis such that said discs will effect several revolutions for one swinging movement of said arms, whereby said arms may be operated at predetermined time intervals during rotational movement of said discs.

3. In a time-controlled circuit selector, a casing, a plurality of rotatable discs mounted in said casing and having a plurality of electric contact operating means arranged along a spiral line having a plurality of circumvolutions, a pair of electric contact arms associated with each of said discs, said contact arms pivoted on said casing at a point spaced from the axis of said discs and swingable thereacross to be successively electrically operated by said electric contact arms operating means when sweeping across said same means, means for rotating said discs at an equal number of revolutions per unit time, means for swinging said arms in timed relation with said discs and across the same such that said discs will effect several revolutions for one swinging movement of said arms, an independent electric circuit connected to each pair of contact arms, and a time controlled multiple switch connected to said contact arms.

4. In a time-controlled circuit selector, a casing, a shaft journalled in said casing, a plurality of program discs keyed on said shaft and having a plurality of electric contact arms operating means arranged along a spiral line having a plurality of circumvolutions, a pair of electric contact arms associated with each of said discs and pivoted on said casing at a point spaced from the shaft of said discs, means for swinging said arms in timed relation with the rotation of said discs from the periphery of the latter towards the center of the same such that said discs will effect several revolutions for one swinging movement of said arms, said arms operated successively by said electric contact arms operating means upon their swinging movement across said discs, means for returning said arms to a point adjacent the periphery of said discs, and means for rotating said discs at an equal number of revolutions per unit time whereby said arms may be operated at predetermined time intervals during rotational movement of said discs.

5. In a time-controlled circuit selector, a casing, a shaft journalled in said casing, a plurality of spaced program discs keyed to said shaft and having perforations arranged along a spiral line having a plurality of circumvolutions, a pair of electric contact arms associated with each of said discs and pivoted at one end on said casing at a point spaced from said shaft for swinging movement relatively to said discs, an independent electric circuit associated with each of said pairs of contact arms, said contact arms capable of assuming a circuit closing position and a circuit opening position, a portion of at least one arm of each pair engageable with said perforations upon rotating movement of said discs and swinging movement of said arms to operate said pair of arms from one of said positions to the other, means for rotating said discs at an equal number of revolutions per unit time and means for swinging said arms from the periphery of said discs to a point near the center of the same in timed relation with the rotational movement of said discs so as to become successively engaged with all said perforations during several rotations of said discs, whereby said arms may be operated at predetermined time intervals during rotational movement of said discs.

6. In a time-controlled circuit selector, a casing, a shaft journalled in said casing, a plurality of spaced parallel program discs keyed to said shaft and having spirally arranged electric contact arms operating means, a pair of electric contact arms associated with each of said discs and pivoted on said casing at a point spaced from said shaft, said arms swingable across said discs from the periphery thereof towards said shaft, to be operated by said means when contacting the same, means to impart to said discs a discontinuous rotational movement such that said discs will remain stationary for a certain time interval, means for swinging said arms in timed relation with the rotational movement of said discs, said arms remaining stationary when said discs are stationary whereby said arms will remain for a certain time interval in contact with said electric contact arms operating means.

7. In a time-controlled circuit selector, as claimed in claim 6, wherein said means to impart to said disc a discontinuous rotational movement comprise a second shaft journalled in said casing, driving means to rotate said shaft at a continuous speed, a cam keyed to said second shaft, a pawl actuated by said cam, a ratchet wheel engaged by said pawl, said ratchet wheel keyed to said first shaft on which said discs are mounted.

8. In a time-controlled circuit selector, as claimed in claim 7, a stop arm freely pivoted on said second shaft and engageable with said ratchet wheel at its free end to prevent backward movement of the same, and a longitudinally slit leaf spring, its slit portions contacting respectively said pawl and said stop arm to urge the same against said ratchet wheel and secured at its other end to said casing.

9. In a time-controlled circuit selector, a casing, a first shaft journalled in said casing, a plurality of rotatable spaced program discs keyed to said shaft and having a plurality of perforations arranged in a spiral co-axial with said shaft, a pair of electric contact arms associated with each of said discs, a second shaft journalled in said casing spaced from said first shaft, said arms keyed at one end to said second shaft, said arms swingable across said discs from the periphery to the center thereof, the free end of at least one of each pair of said arms adapted to engage said perforations successively upon rotational movement of said discs and swingable movement of said arms whereby to contact the other arm of each of said pairs, means to impart to said discs a discontinuous rotational movement, means for swinging said arms in timed relation with the discontinuous movement of said discs, an independent electric circuit connected to each pair of contact arms, a multiple rotary switch connected to said pairs of contact arms and rotatable in timed relationship with said discs and a single feeder electric circuit connected to said rotary switch whereby said feeder circuit is successively connected to said different pairs of contact arms and associated independent electric circuits upon rotation of said rotary switch.

10. In a time controlled circuit selector as claimed in claim 9 said independent electric circuits each comprising a second pair of contact arms and means to make and break said contact arms comprising a rotatably mounted notched disc, one arm of each pair of said second pair of contact arms adapted to engage said notches upon rotation of said notched discs and means to rotate said notched discs in timed relation with said program discs.

11. In a time controlled circuit selector, a casing, a first shaft, a plurality of rotatable program discs keyed on said shaft, and having a plurality of perforations arranged in a spiral path on said discs co-axial with said shaft, a second shaft journaled in said casing and spaced from said first shaft, a pair of electric contact arms associated with each of said discs keyed to said second shaft, and swingable across said discs to be operated to close the electric circuit associated with each pair of said arms upon registering of one portion of one of said arms in each pair with said perforations of said discs, means to impart to said discs a discontinuous rotational movement comprising pawl and ratchet means associated with said first shaft, means for swinging said arm in timed relation with said discs comprising a spiral cam rotated by said pawl and ratchet means, a bar abutting at one end against said spiral cam to be longitudinally displaced away from the same, a lever keyed to said second shaft and engaging the other end of said bar to be displaced thereby, and spring means to return said lever and said bar towards the center of said spiral cam.

12. In a time controlled circuit selector, as claimed in claim 11, a rotary switch mounted in said casing, a ratchet wheel for actuating said rotary switch, a pawl member secured to said bar and engaging said ratchet wheel to rotate the same, said rotary switch capable of connecting a main electric circuit successively to each different pair of said electric contact arms.

13. A time controlled circuit selector comprising a casing, a first shaft journalled in said casing, means to rotate said shaft at a constant speed of 1 revolution per minute, an eccentric keyed to said shaft, a pawl rotatably engaging said eccentric at one end, a second shaft journalled in said casing, a ratchet wheel keyed to said second shaft, the other end of said pawl engaging said ratchet wheel to displace the same at 1 revolution per hour, spring means to urge said pawl against said ratchet wheel, a third shaft, intermeshing gear wheels between said second and third shaft to rotate said third shaft one revolution per 12 hours, a fourth shaft driven by said third shaft at one revolution per day and journalled in said casing, a spiral cam keyed to said fourth shaft, a bar mounted for longitudinal movement on said casing abutting at one end said spiral cam, a fifth shaft journalled in said casing, a lever keyed to said fifth shaft and abutting the other end of said bar to be arcuately displaced thereby, a plurality of program discs keyed to said second shaft in spaced parallel relationship and having a plurality of perforations arranged in a spiral path on each said disc co-axial with said second shaft, a pair of electric contact arms associated with each of said discs and keyed to said fifth shaft to swing across the said discs upon rotation of said fifth shaft, an arm of each pair of said contact arms having a projection capable of registering with said perforations of said discs whereby said arm will contact the other arm of each of said pairs, a second pawl member secured to said bar and displaceable therewith, a second ratchet wheel engaged by said second pawl to rotate at one revolution per week, a rotary switch keyed to said second ratchet wheel having as many stationary contacts as there are pairs of electric contact arms, a rotary contact arm keyed to said second ratchet wheel adapted to contact successively each of said stationary contacts of said rotary switch, an electric feeder circuit connected to said rotary contact arm, said stationary contacts independently connected in series to each pair of said contact arms, a plurality of notched discs keyed to said first shaft, a second pair of electric contact arms associated with each of said notched discs to be operated thereby and individually connected to each pair of electric contact arms associated with said program discs, whereby said rotary switch will close a predetermined selected circuit, said electric contact arm associated with said selected circuit will close said circuit at a predetermined minute, and the corresponding notched disc will operate said circuit through its associated contact arm a certain number of times and for a predetermined duration during said minute.

EDMOUR GEOFFRION.

References Cited in the file of this patent
UNITED STATES PATENTS

| Number | Name | Date |
|--------|------|------|
| 2,347,344 | Waidelich | Apr. 25, 1944 |